Dec. 11, 1951     J. D. BALDWIN, JR     2,577,838
STAMPED VALVE HANDLE
Filed Dec. 10, 1947
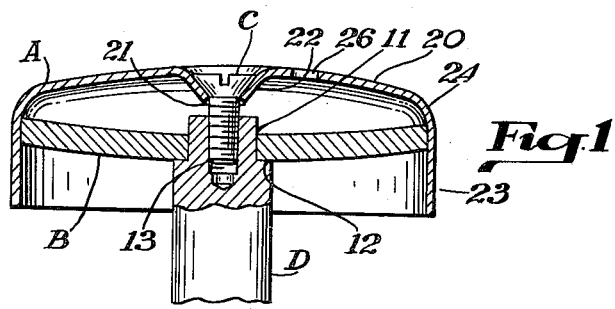
Fig.1
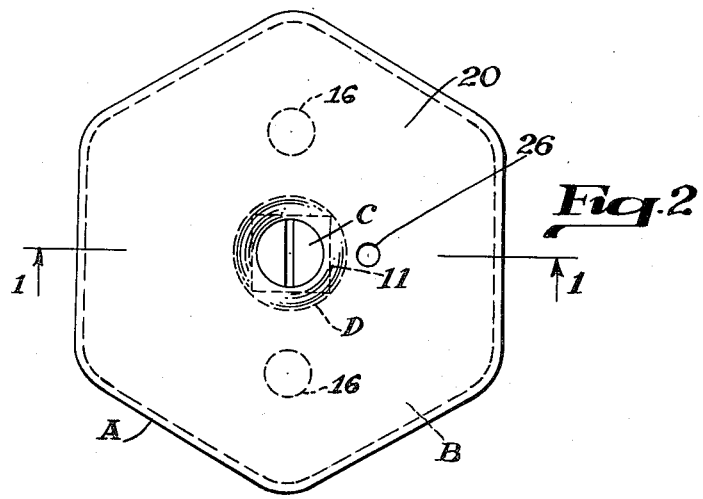
Fig.2
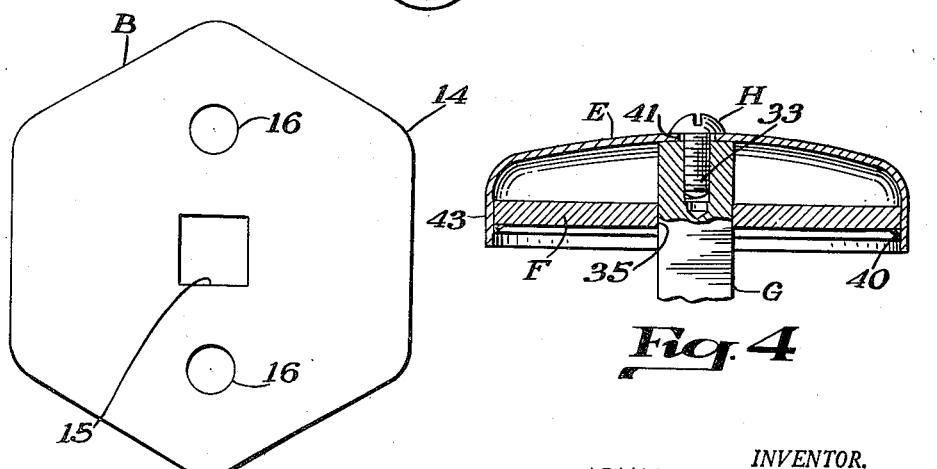
Fig.3
Fig.4
INVENTOR.
JOHN D. BALDWIN, JR.
BY Richey & Watts
ATTORNEYS.

Patented Dec. 11, 1951  2,577,838

UNITED STATES PATENT OFFICE

STAMPED VALVE HANDLE 2,577,838

John D. Baldwin, Jr., South Euclid, Ohio, assignor to The Weatherhead Company, Cleveland, Ohio, a corporation of Ohio Application December 10, 1947, Serial No. 790,832

5 Claims. (Cl. 287—53)

This invention relates to handles, particularly handles for manual rotation of shafts, such, for example, as valve stems. The principal objects realized by the invention are the provision of a handle adapted for mounting on a shaft without extensive or unusual preparation of the shaft; a handle which is convenient and comfortable to grasp; which is adapted to economical production by press operations from light sheet metal; which is free from lost motion when assembled on the shaft; which readily accommodates the embossing of indicia on the handle; and which may be easily applied to and removed from the shaft.

Other objects and advantages of the invention, more or less ancillary in nature, will be apparent to those skilled in the art from the description herein of the preferred embodiment of the invention.

Referring to the drawings:

Fig. 1 is a sectional view of a preferred form of handle taken on the plane indicated in Fig 2, illustrating the mounting of the handle on a shaft;

Fig. 2 is a plan view of the same;

Fig. 3 is a plan view of a backing plate forming part of the handle; and

Fig. 4 is a sectional view of a modified form of handle.

The handle of Figs. 1 to 3 comprises only two parts, a cap A and a backing plate B, and is held on the end of the shaft D by a machine screw C. The shaft D may be of any form and may be connected to any desired device to be operated. In order to apply the handle to the shaft D, the upper end portion thereof 11 is formed to a non-circular section, preferably square, terminated by a shoulder 12 against which the handle is seated, and is bored and tapped centrally as indicated at 13 for the reception of the machine screw C. The backing plate B is preferably a punching or stamping of sheet metal of hexagonal outline with slightly rounded corners 14. A central aperture 15 formed in the backing plate is dimensioned to fit over the non-circular end 11 of the shaft for non-rotative engagement therewith. The plate B is slightly dished, as will be seen in Fig. 1, and is mounted on the shaft with its concave side outermost.

The handle cap A is drawn from light gauge sheet metal to form a shallow inverted cup preferably of rounded hexagonal form with a domed central portion 20. The center of the cap is formed to provide a clearance hole 21 for the screw C and preferably a recess 22 for the screw head. The lateral walls 23 of the cap are joined to the face 20 by a curved portion 24. In the assembly of the valve, the backing plate B is placed over the end portion of the stem, the cap A is slipped over the backing plate, and the screw C is inserted and tightened. The parts are so proportioned that the radiused portion 24 of the cap engages the margin of the plate B, which is designed for a slight clearance within the straight portion 23 of the cap flange. The screw thus pulls the cap into tight radial engagement with the plate, due to the convergence of the cap. The recessed portion 22 of the cap remains clear of the end of the stem D, the parts A and B thus remaining in tight engagement under compression between the head of the screw C and the shoulder 12 of the stem. The convexity of the members A and B improves their resistance to this compressive force. The assembled handle thus remains in a state of tension, preventing any looseness of the parts, and holding the screw C frictionally against backing out.

The cap A is of lighter material than the plate B. Since the turning moment of the cap is transmitted at its periphery, there are no large stresses on the cap. The member B which engages the relatively small stem portion 11 receives the only substantial stress; thus the member B, which is a punching of very simple form, may be made from relatively intractable heavy sheet metal, while the cap A is made of light sheet, which may be in practice about one-third the weight of the sheet employed for the plate B.

Utilization of light metal for the cap A not only facilitates and permits economies in the forming of the convenient and attractive domed hexagonal shape, but offers other advantages. The cap A may be easily embossed to display legends or trade-marks. Also, because of its light gauge, the cap A transmits heat rather poorly, and because of this fact and the absence of direct contact between the cap and the shaft D, it remains at relatively comfortable temperatures even though the stem D may be cooled by refrigerant or heated by steam, for example.

The only assembly operation in the construction of this handle is the necessary one of screwing it on the shaft. Factory operations, such as welding, riveting, or spinning to assemble the component parts of the handle are eliminated, with resulting economies.

While the hexagonal outline of the handle illustrated is preferred, it will be obvious that the cap and backing plate may be of various conformations adapted to afford a convenient hand grip and provide non-rotational engagement of the two members.

A small hole 26 is punched in the cap member and two holes 16 are punched in the back plate, to provide vents therein and prevent undesirable accumulations of water in case the handle is exposed to the weather.

It has been found that a strong handle of the form illustrated and 2¼ inches in diameter across the flats can be formed from steel plate approximately 4/100 inch thick for the cap and 12/100 inch thick for the backing plate. These figures are given for purposes of illustration only, as the most satisfactory thicknesses will depend upon the degree of severity of service for which the handle is made, the size of the handle, and the characteristics of the material. Satisfactory proportions and thicknesses for the parts may be determined by those skilled in the art for any conditions of service by the application of known principles of design of sheet metal articles.

Fig. 4 illustrates a modified form of handle which embodies many of the principles and advantages of the form previously described, and is adapted for mounting on a shaft not formed with a shoulder such as 12 in Fig. 1.

The handle of Fig. 4 comprises a cap E and a backing plate F mounted on a shaft G by a screw H. The shaft G is illustrated as square, although it could be of any non-circular section, and is formed with a tapped hole 33 in the end for the screw H.

The cap E is substantially of the same form as the cap A, as shown in Fig. 2, and may be stamped from light sheet metal. A punched hole 41 accommodates the screw H, and a recess for the screw may be formed if desired.

The backing plate F, formed from relatively heavy sheet metal, may be of the generally hexagonal form illustrated in Fig. 3 or other non-circular form to correspond to the outline of the cap E, and has a square central hole 35 for the shaft. The plate F receives no thrust perpendicular to its surface, and therefore need not be dished. The plate F is fixed in the flange 43 of the cap E in any suitable manner, such as by welding at the margin thereof, as indicated at 40.

It should be noted that the union of the cap and backing plate is not required for the transmission of torque, but merely to retain the parts assembled, as the shaft G is without a shoulder. The particular method of fixing the parts E and F together is immaterial.

In comparison with the form of Fig. 1, the handle of Fig. 4 requires an assembly operation, but does not require a shoulder on the shaft.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A handle for rotation of a shaft including a non-circular portion, the handle comprising a cup-shaped member formed of relatively light sheet metal stock and having a non-circular marginal flange, and a substantially flat plate of sheet metal the thickness of which is substantially greater than that of said cup-shaped member, said plate having its margin formed to non-rotatively engage within the said flange and provided with a central non-circular aperture formed to engage the shaft, whereby torque is transmitted from the cap to the plate at the outer marginal portions thereof, and a hole through the cap for a screw or the like for attachment to the stem.

2. A handle for rotation of a shaft including a non-circular portion, the handle comprising a cup-shaped member formed of relatively light sheet metal stock and having a polygonal marginal flange, and a substantially flat plate of sheet metal the thickness of which is substantially greater than that of said cup-shaped member, said plate having a polygonal margin formed to non-rotatively engage the said flange and provided with a central non-circular aperture formed to engage the shaft, whereby torque is transmitted from the cap to the plate at the outer marginal portions thereof, and a hole through the cap for a screw or the like for attachment to the stem.

3. A valve stem and handle assembly comprising a stem having a non-circular portion, a handle comprising a cup-shaped cap member formed of relatively light sheet metal stock and having a non-circular marginal flange, and a substantially flat plate of sheet metal the thickness of which is substantially greater than that of said cup-shaped member, said plate having its margin formed to non-rotatively engage within the said flange and provided with a central non-circular aperture formed to engage the end portion of said stem, and screw means extending through said cap and engaging said stem to hold the cap and plate in place on the stem.

4. A valve stem and handle assembly comprising a stem having a non-circular end portion and a shoulder, a handle comprising a cup-shaped cap member formed of relatively light sheet metal stock and having a dished top and a non-circular marginal flange, a plate of sheet metal the thickness of which is substantially greater than that of said cup-shaped member, said plate having its margin formed to non-rotatively engage within the said flange at the junction of the flange and the top, said plate being provided with a central non-circular aperture formed to engage the end portion of the stem, said plate also engaging said shoulder, said plate and the top of said cap member being formed so that there is clearance between the top, the plate, and the end of said stem, a central aperture in said cap member, and screw means extending through said aperture and connected to said stem to retain the cap member and plate on the stem, the top of said cap member being stressed across its diameter by said screw means.

5. A valve stem and handle assembly comprising a stem having a non-circular portion, a handle comprising a cup-shaped cap member formed of relatively light sheet metal stock and having a non-circular marginal flange, and a substantially flat plate of sheet metal the thickness of which is substantially greater than that of said cup-shaped member, said plate having its margin formed complementary to said flange, said plate being bonded to said flange in spaced relation from the top of said cap member, said plate being provided with a central non-circular aperture formed to engage the end portion of said stem, and screw means extending through said cap and engaging said stem to hold the cap and plate in place on the stem.

JOHN D. BALDWIN, Jr.

REFERENCES CITED

The following references are of record in the file of this patent:

UNITED STATES PATENTS

| Number | Name | Date |
|---|---|---|
| 941,906 | Beardsley | May 30, 1909 |
| 1,787,105 | Delany | Dec. 30, 1930 |
| 1,909,494 | Leins | May 16, 1933 |
| 1,923,691 | Schoenstein | Aug. 22, 1933 |